(12) United States Patent
Chen et al.

(10) Patent No.: US 11,108,118 B2
(45) Date of Patent: Aug. 31, 2021

(54) CELL AND ELECTROCHEMICAL DEVICE

(71) Applicant: NINGDE AMPEREX TECHNOLOGY LIMITED, Ningde (CN)

(72) Inventors: Xiangrong Chen, Ningde (CN); Zhiyuan Liu, Ningde (CN); Huiqin Wang, Ningde (CN); Ying Wang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 133 days.

(21) Appl. No.: 16/355,399

(22) Filed: Mar. 15, 2019

(65) Prior Publication Data
US 2020/0067063 A1 Feb. 27, 2020

(30) Foreign Application Priority Data

Aug. 27, 2018 (CN) .......................... 201821380497.4

(51) Int. Cl.
*H01M 2/26* (2006.01)
*H01M 10/0587* (2010.01)
(Continued)

(52) U.S. Cl.
CPC ..... *H01M 50/531* (2021.01); *H01M 10/0587* (2013.01); *H01M 50/461* (2021.01); *H01M 10/0431* (2013.01)

(58) Field of Classification Search
CPC .......... H01M 2/26; H01M 2/168; H01M 2/32; H01M 2/34; H01M 10/0587; H01M 10/0431; H01M 50/461; H01M 50/531
See application file for complete search history.

(56) References Cited

U.S. PATENT DOCUMENTS

2002/0197535 A1* 12/2002 Dudley ............... H01M 4/0435
429/246
2004/0191634 A1* 9/2004 Yanagawa ......... H01M 10/0431
429/246
(Continued)

FOREIGN PATENT DOCUMENTS

CN 203733894 U 7/2014
CN 207183445 U 4/2018
WO WO2018/121433 7/2018

OTHER PUBLICATIONS

Ningde Amperex Technology Limited, Extended European Search Report, EP19193676.4, dated Jan. 14, 2020, 8 pgs.

*Primary Examiner* — Ula C Ruddock
*Assistant Examiner* — Matthew W Van Oudenaren
(74) *Attorney, Agent, or Firm* — Morgan, Lewis & Bockius LLP

(57) ABSTRACT

The present application discloses a cell and an electrochemical device. The cell includes: a first electrode sheet, a first electrode tab, a second electrode sheet, and a second electrode tab. The first electrode sheet includes a first current collector and a first active material layer. The first current collector includes a first end portion, and two sides of the first end portion are provided with the first active material layer. The second electrode sheet includes a second current collector and a second active material layer. The first end portion has a width being one third of a width of the first electrode tab. In a first direction, the cell has a thickness t at the first end portion, the cell has a thickness T at the first electrode tab or the second electrode tab, and t is greater than or equal to 95% of T.

20 Claims, 10 Drawing Sheets

(51) Int. Cl.
*H01M 2/16* (2006.01)
*H01M 50/531* (2021.01)
*H01M 50/46* (2021.01)
*H01M 10/04* (2006.01)

(56) References Cited

U.S. PATENT DOCUMENTS

2014/0030607 A1\* 1/2014 Noguchi ............. H01M 4/0421
429/322
2015/0207111 A1\* 7/2015 Tao ........................ H01M 4/13
429/162

\* cited by examiner

CELL AND ELECTROCHEMICAL DEVICE

CROSS-REFERENCE TO RELATED APPLICATION

This application claims priority to and benefit of Chinese Patent Application Serial No. 201821380497.4, filed with the China National Intellectual Property Administration on Aug. 27, 2018, the entire content of which is incorporated herein by reference.

FIELD

The present application relates to a field of batteries, more particularly to a cell and an electrochemical device having the cell.

BACKGROUND

In recent years, the lithium-ion batteries have developed rapidly in applications such as electronic products and electrically powered tools due to their high cell energy density, customizable design, safety, and reliability. As market demand expands, the lithium-ion batteries will have a development trend towards higher energy density, high power, and quick charge/discharge performance. However, a wound cell has an asymmetric structure in its thickness direction, and there are several areas where a cathode diaphragm and an anode diaphragm is missing, resulting in the uneven thickness of the cell. Especially in the design of a high energy density and quick charge system, these areas are prone to risks of poor interface contact, serious polarization during charging and discharging processes, and a rapid decline in retention rate after a long cycle.

SUMMARY

The present application aims to solve at least one of the technical problems existing in the related art. Accordingly, an objective of the present application is to propose a cell whose thickness is more uniform, which can improve flatness of the cell, thereby improving energy density of the cell. The present application further proposes an electrochemical device.

The cell according to the present application includes: a first electrode sheet, a first electrode tab, a second electrode sheet and a second electrode tab. The first electrode sheet includes a first current collector and a first active material layer. The first current collector includes a first end portion, and two sides of the first end portion are provided with the first active material layer. The first electrode tab is electrically connected with the first current collector. The second electrode sheet includes a second current collector and a second active material layer, the second active material layer is located on a surface of the second current collector. The second electrode tab is electrically connected with the second current collector. The first end portion has a width being one third of a width of the first electrode tab, and in a first direction, the cell has a thickness t at the first end portion, while the cell has a thickness T at the first electrode tab or the second electrode tab, t being greater than or equal to 95% of T.

According to the cell of the present application, through cooperation among the first electrode sheet, the first electrode tab, the second electrode sheet and the second electrode tab, the thickness of the cell can be made more uniform, and the flatness of the cell can be improved, thereby increasing the energy density of the cell, so as to reduce a risk of cycle failure caused by insufficient pressure and loose interface contact at the corners of the cell at the time of fixture formation thereof.

In some examples of the present application, the second current collector includes a first abutting segment adjacent to the first end portion, and in the first direction, the first abutting segment does not overlap with the first end portion. In the first direction, the cell has a thickness ta at the first abutting segment, and an absolute value of a difference between ta and T is smaller than or equal to 150 μm.

In some examples of the present application, the cell further includes a first bending section, in which the first abutting segment is located between the first bending section and the first end portion, and an absolute value of a difference between t and T is smaller than or equal to 50 μm.

In some examples of the present application, the cell further includes a separator located between the first electrode sheet and the second electrode sheet. The second electrode sheet is further provided with a first diaphragm adhesive. The thickness t at the first end portion is composed of a thickness t1 of a plurality of layers of the first electrode sheets, a thickness t2 of a plurality of layers of the second electrode sheets, a thickness t3 of a plurality of layers of the separators, and a thickness t4 of a plurality of layers of the first diaphragm adhesive.

In some examples of the present application, the first electrode sheet includes a first diaphragm, and the first diaphragm is provided to a head and a tail of the first active material layer. The second electrode sheet includes a second diaphragm, and the second diaphragm is provided to a head and a tail of the second active material layer, the first diaphragm adhesive being provided on the second diaphragm.

In some examples of the present application, the first diaphragm adhesive at a head of the second electrode sheet has a thickness of 25 to 100 μm and a width of 8 to 16 mm.

In some examples of the present application, the first diaphragm adhesive at a tail of the second electrode sheet has a thickness of 25 to 100 μm and a width of 12 to 20 mm.

In some examples of the present application, the first diaphragm adhesive is an adhesive tape with a gradient change in thickness.

In some examples of the present application, the first diaphragm adhesive includes a first thickness segment and a second thickness segment, and the first thickness segment has a thickness smaller than the second thickness segment.

In some examples of the present application, the first thickness segment has a thickness of 10 to 16 μm, while the second thickness segment has a thickness of 25 to 100 μm.

In some examples of the present application, the first electrode tab or the second electrode tab is provided with a first protective adhesive. The thickness T at the first electrode tab or the second electrode tab is composed of the thickness t1 of the plurality of layers of the first electrode sheets, the thickness t2 of the plurality of layers of the second electrode sheets, the thickness t3 of the plurality of layers of the separators, a thickness t5 of the first electrode tab or the second electrode tab, and a thickness t6 of the first protective adhesive.

In some examples of the present application, the first protective adhesive is provided to two sides of the first electrode tab or two sides of the second electrode tab.

In some examples of the present application, the thickness ta at the first abutting segment is composed of the thickness t1 of the plurality of layers of the first electrode sheets, the thickness t2 of the plurality of layers of the second electrode sheets, and the thickness t4 of the plurality of layers of the first diaphragm adhesive, the first diaphragm and the second diaphragm being located within the first abutting segment.

In some examples of the present application, the second electrode sheet further includes a second protective adhesive configured to protect a cutting position, the second protective adhesive is provided to the second current collector, and the second protective adhesive has a thickness of 25 to 100 μm and a width of 8 to 16 mm.

The electrochemical device includes the above cell.

The beneficial effects of the present application at least lie in that the flatness of the cell and hence the energy density thereof can be improved, so as to reduce the risk of cycle failure caused by insufficient pressure and loose interface contact at the corners of the cell at the time of fixture formation thereof. The reason for the above beneficial effects is that if the cell is uneven in structure, it is easy to cause contact with the thickest position (i.e., a position corresponding to a positive electrode tab or a negative electrode tab) of the cell firstly when it is compressed into a clamping plate in a fixture formation process, such that the pressure at the position is maximized. Although the cell is deformed and contracted after being subjected to pressure, and the other region other than the positive and negative electrode tabs are subjected to an increased pressure, the corner area is insufficiently pressed or even is not pressed due to thinness, which is not conducive to the formation of a compact SEI (Solid Electrolyte Interphase) film with excellent performance. Additionally, due to the loose contact among the layers at the corners, the interface contact during the long-circulation process is deteriorated, resulting in large polarization at this point, which is easy to form a black spotted lithium interface, and eventually leads to cycle failure.

BRIEF DESCRIPTION OF THE DRAWINGS

These and other aspects and advantages of embodiments of the present application will become apparent and more readily appreciated from the following descriptions made with reference to the drawings, in which.

Figure 1:
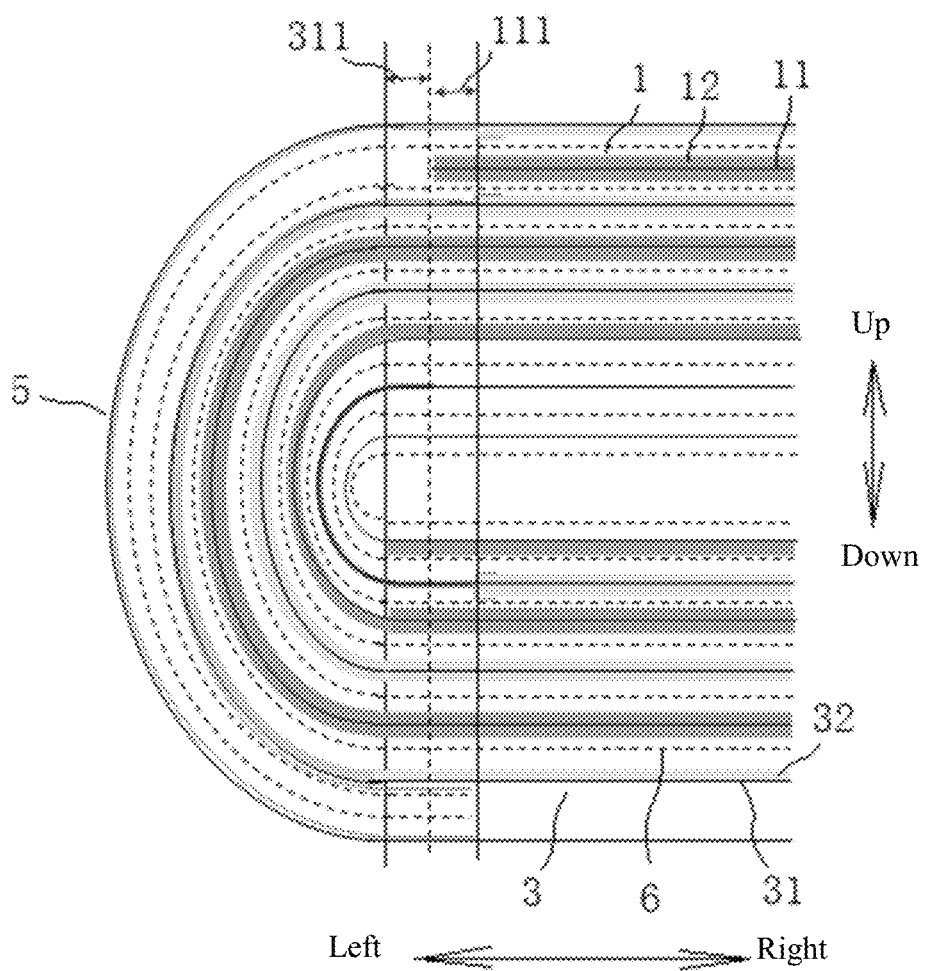
FIG. 1 is a partially enlarged view of a cell according to an embodiment of the present application.

REFERENCE NUMERALS cell 10;
first electrode sheet 1, first current collector 11, first end portion 111;
first active material layer 12;
first electrode tab 2;
second electrode sheet 3, second current collector 31, first abutting segment 311;
second active material layer 32;
first diaphragm adhesive 33, first thickness segment 331, second thickness segment 332;
second electrode tab 4, first bending section 5, separator 6, first protective adhesive 7.

DETAILED DESCRIPTION

Embodiments of the present application will be described in detail and examples of the embodiments will be illustrated in the drawings, where same or similar reference numerals are used to indicate same or similar elements or elements with same or similar functions. The embodiments described herein with reference to drawings are illustrative, and used to explain the present application. The embodiments shall not be construed to limit the present application.

A cell 10 according to embodiments of the present application will be described with reference to FIGS. 1-12.

As illustrated in FIGS. 1-12, the cell 10 according to the embodiments of the present application includes a first electrode sheet 1, a first electrode tab 2, a second electrode sheet 3, and a second electrode tab 4. It should be noted that if the first electrode sheet 1 is an anode electrode sheet, the second electrode sheet 3 is a cathode electrode sheet, and if the second electrode sheet 3 is an anode electrode sheet, the first electrode sheet 1 is a cathode electrode sheet.

The first electrode sheet 1 is adopted as the anode electrode sheet by way of example in the present application. The first electrode sheet 1 can include a first current collector 11 and a first active material layer 12, the first current collector 11 can include a first end portion 111, and two sides of the first end portion 111 are provided with the first active material layer 12 separately. The first electrode tab 2 is electrically connected with the first current collector 11. The second electrode sheet 3 can include a second current collector 31 and a second active material layer 32, and the second active material layer 32 is located on a surface of the second current collector 31. The second electrode tab 4 is electrically connected with the second current collector 31.

The first end portion 111 can have a width being one third of a width of the first electrode tab 2. In a first direction, a thickness of the cell 10 at the first end portion 111 is denoted as t, while a thickness of the cell 10 at the first electrode tab 2 or the second electrode tab 4 is denoted as T, in which t 95% T. It should be noted that the first direction refers to an up-and-down direction in FIG. 1.

By configuring the width of the cell 10 at the first end portion 111 to be one third of the width of the first electrode tab 2, and configuring the thickness of the cell at the first end portion 111 to be greater than or equal to the thickness of the cell at the first electrode tab 2 or the second electrode tab 4, the thickness of the cell 10 can become more uniform, and the flatness of the cell 10 can be improved, so that the energy density of the cell 10 can be improved, thereby reducing a risk of cycle failure caused by insufficient pressure and loose interface contact at corners of the cell 10 at the time of fixture formation thereof. Meanwhile, it is also possible to reduce the manufacturing difficulty of the cell 10, improve the production efficiency of the cell 10, and lower the manufacturing cost of the cell 10.

Thus, through cooperation among the first electrode sheet 1, the first electrode tab 2, the second electrode sheet 3, and the second electrode tab 4, the thickness of the cell 10 can be made more uniform, and the flatness of the cell 10 can be improved, thereby increasing the energy density of the cell 10, so as to reduce the risk of cycle failure caused by insufficient pressure and loose interface contact at the corners of the cell 10 at the time of fixture formation thereof.

In some embodiments of the present application, as illustrated in FIG. 1, the second current collector 31 can include a first abutting segment 311 adjacent to the first end portion 111, and in the first direction, the first abutting segment 311 does not overlap with the first end portion 111 (the term "adjacent to" in the present application means a distance between the first abutting segment 311 and the first end portion 111 is less than 1 mm in a left-and-right direction on the premise that the first abutting segment 311 and the first end portion 111 do not overlap in the up-and-down direction), that is, in the up-and-down direction, the first abutting segment 311 does not overlap with the first end portion 111, such that the thickness of the cell 10 can be made more uniform, and the flatness of the cell 10 can be further improved.

In some embodiments of the present application, as illustrated in FIG. 1, the cell 10 can further include a first bending section 5. The first abutting segment 311 is located between the first bending section 5 and the first end portion 111, and an absolute value of a difference between the thickness at the first end portion 111 and the thickness at the first electrode tab 2 or the second electrode tab 4 is smaller than or equal to 50 i.e., |t−T|≤50 μm, such that the thickness of the cell 10 can be made more reasonable, and the energy density of the cell 10 can be ensured.

Figure 2:
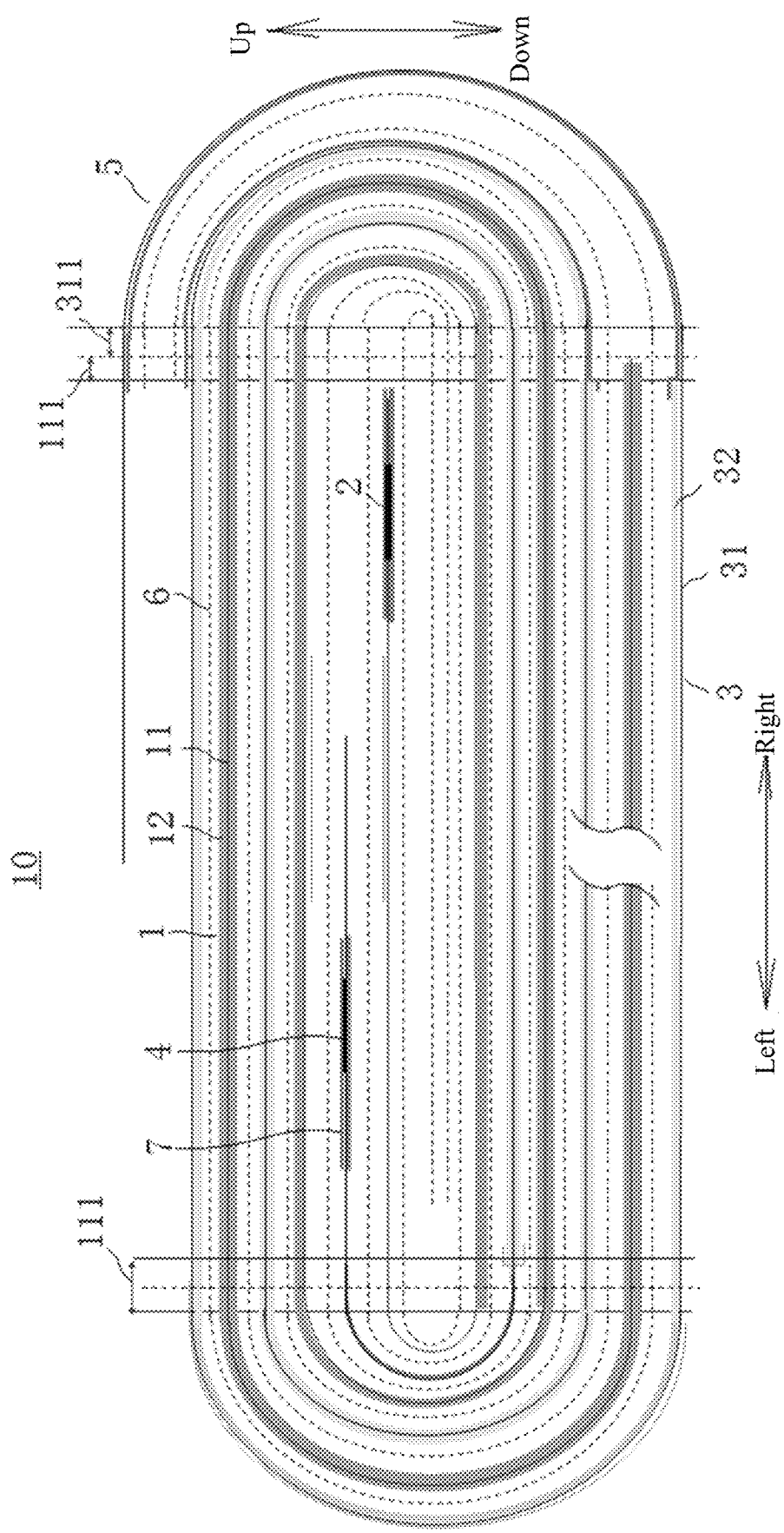
FIG. 2 is a schematic view of a cell according to a specific embodiment of the present application.

Furthermore, as illustrated in FIG. 1, the first end portion 111 and the first abutting segment 311 of the cell 10 with a wound structure in odd numbered layers are located at the same side; a corner region is defined between a tail diaphragm of the first electrode sheet 1 and the first bending section 5, while the remaining region is a region of a tail green tape corresponds to the diaphragm of the first electrode sheet 1. As illustrated in FIG. 2, the first end portions 111 and the first abutting segments 311 at the head and tail of the cell 10 with a wound structure in even numbered layers are located at the opposite sides.

In some embodiments of the present application, as illustrated in FIG. 1, the cell 10 can further include a separator 6 isolated between the first electrode sheet 1 and the second electrode sheet 3, and the separator 6 can serve as a barrier to space the first electrode sheet 1 apart from the second electrode sheet 3, thereby preventing a short circuit from occurring inside the cell 10, so as to ensure the safety of use of the cell 10.

In some embodiments of the present application, the first electrode sheet 1 can include a first diaphragm, and the first diaphragm may be disposed at the head and the tail of the first active material layer 12; the second electrode sheet 3 can include a second diaphragm, and the second diaphragm may be disposed at the head and the tail of the second active material layer 32; a first diaphragm adhesive 33 may be provided on the second diaphragm.

By adjusting the thickness of the first diaphragm adhesive 33 on the second diaphragm, or lengthening a diaphragm length of the active material layer (increasing the amount of the active material), or combining the above two manners, it is possible to compensate the thickness of the cell 10 at a position corresponding to the first bending section 5, and control a difference between the thickness at the first electrode tab 2 or the second electrode tab 4 and the thickness of the cell 10 at the corners, so as to better improve the flatness of the cell 10, thereby reducing the risk of cycle failure caused by insufficient pressure and loose interface contact at the corners of the cell 10 at the time of fixture formation thereof.

In some embodiments of the present application, the first diaphragm adhesive 33 at the head of the second electrode sheet 3 has a thickness of 25 to 100 μm, and this first diaphragm adhesive 33 has a width of 8 to 16 mm. It should be noted that a width direction of the first diaphragm adhesive 33 refers to the left-and-right direction in FIG. 1. Thus, such an arrangement can make the size of the first diaphragm adhesive 33 at the head of the second electrode sheet 3 more reasonable, and the thickness of the cell 10 can be made more uniform.

In some embodiments of the present application, the first diaphragm adhesive 33 at the tail of the second electrode sheet 3 can have a thickness of 25 to 100 μm, and this first diaphragm adhesive 33 can have a width of 12 to 20 mm. The thickness of the first diaphragm adhesive 33 at the head of the second electrode sheet 3 and the first diaphragm adhesive 33 at the tail of the second electrode sheet 3 can be adjusted alternatively or simultaneously according to actual design requirements. By adjusting the thickness of the first diaphragm adhesive 33, the thickness missing at the first abutting segment 311 and the first end portion 111 of the cell 10 due to the first diaphragm and the second diaphragm can be compensated, such that the difference between the thickness at the corner of the cell 10 and the thickness at the first electrode tab 2 or the second electrode tab 4 of the cell 10 can be reduced, or the thickness at the corner of the cell 10 can be consistence with the thickness at the first electrode tab 2 or the second electrode tab 4 of the cell 10. At the time of fixture formation, the pressure at the corner of the cell 10 is increased to promote formation of a good SEI (Solid Electrolyte Interphase) film, and the first diaphragm adhesive 33 having an increased thickness fills a gap between the electrode sheets to make the interface contact tighter, and the good interface contact during the long cycle can in turn reduce the risk of cycle failure.

Figure 3:
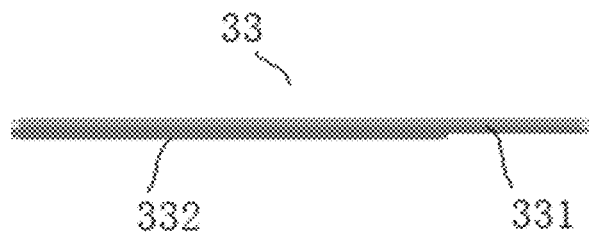
FIG. 3 is a front view of a second protective adhesive of a cell according to an embodiment of the present application.
Figure 4:
FIG. 4 is a side view of a second protective adhesive of a cell according to an embodiment of the present application.
Figure 5:
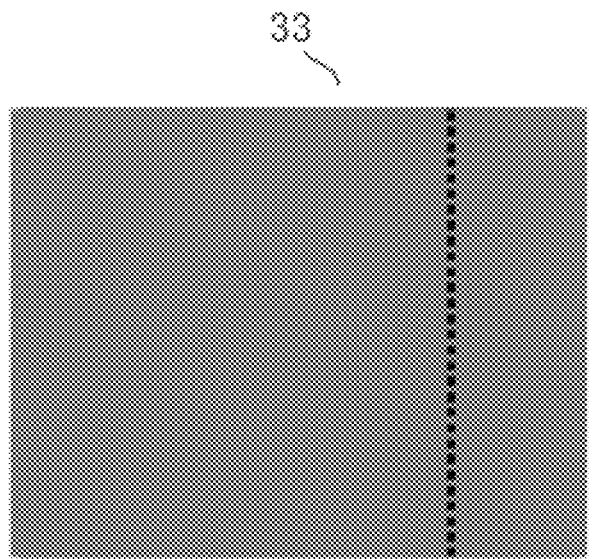
FIG. 5 is a top view of a second protective adhesive of a cell according to an embodiment of the present application.

In some embodiments of the present application, as illustrated in FIGS. 3-5, the first diaphragm adhesive 33 can be an adhesive tape with a gradient change in thickness, in which the gradient change of the thickness of the adhesive tape can improve a phenomenon that a thickness of an overlapping region between the first diaphragm adhesive 33 and the diaphragm may be enlarged after thickness increase.

In some embodiments of the present application, as illustrated in FIG. 3, the first diaphragm adhesive 33 can include a first thickness segment 331 and a second thickness segment 332. The first thickness segment 331 has a thickness smaller than the second thickness segment 332, such that the first diaphragm adhesive 33 can have a more reasonable structure to ensure the gradient change of the thickness of the first diaphragm adhesive 33, thereby guaranteeing the working performance of the first diaphragm adhesive 33.

In some embodiments of the present application, the first thickness segment 331 can have a thickness of 10 to 16 μm, while the second thickness segment 332 can have a thickness of 25 to 100 μm, such that the first diaphragm adhesive 33 can have a more reasonable size design, and the structure of the first diaphragm adhesive 33 can be optimized, thereby promoting the working performance of the first diaphragm adhesive 33.

In some embodiments of the present application, as illustrated in FIGS. 2, 6, 8, 9, 11, 12, the first electrode tab 2 or the second electrode tab 4 can be provided with a first protective adhesive 7, and the first protective adhesive 7 can act to protect the first electrode tab 2 and the second electrode tab 4, thereby preventing the first electrode tab 2 and the second electrode tab 4 from being damaged. The thickness at the first electrode tab 2 and the second electrode tab 4 takes a maximum value of a sum of the thickness at the first electrode tab 2 and the second electrode tab 4 and the thickness of the first protective adhesive 7.

In some embodiments of the present application, as illustrated in FIGS. 2, 6, 8, 9, 11, 12, the first protective adhesive 7 can be provided to upper and lower sides of the first electrode tab 2 or upper and lower sides of the second electrode tab 4, so as to protect the first electrode tab 2 and the second electrode tab 4 better, thereby further preventing the first electrode tab 2 and the second electrode tab 4 from being damaged.

In some embodiments of the present application, a thickness to at the first abutting segment 311 is composed of a thickness t1 of a plurality of layers of the first electrode sheets 1, a thickness t2 of a plurality of layers of the second electrode sheets 3, a thickness t3 of a plurality of layers of the separators 6, and a thickness t4 of a plurality of layers of the first diaphragm adhesives 33, in which the first diaphragm and the second diaphragm are located within the first abutting segment 311.

In some embodiments of the present application, the second electrode sheet 3 can further include a second protective adhesive used to protect a cutting position. The second protective adhesive can be provided to the second current collector 31, and can have a thickness of 25 to 100 μm and have a width of 8 to 16 mm. As a result, the second protective adhesive can have a more reasonable size design, and the structure of the second protective adhesive can be optimized, thereby improving the working performance of the second protective adhesive. Moreover, in a long cycle, the following relationships are satisfied, i.e., the thickness t at the first end portion 111≥95% of the thickness T at the first electrode tab 2 or the second electrode tab 4+(1/N×the thickness T at the first electrode tab 2 or the second electrode tab 4−2×the thickness is of a single layer of the separator 6)×1.08, in which N represents the number of layers of the cell 10. The thickness T at the first electrode tab 2 or the second electrode tab 4=the thickness T1 of the first electrode sheet 1+a thickness T2 of the second electrode sheet 3+a thickness T3 of the separator 6+a thickness T4 of the green tape.

The thickness of the first electrode sheet 1 is a total thickness of all the layers of the first current collector 11, the first active material layer 12 applied on the first current collector 11, and the first electrode tab 2 welded on the first current collector 11. The thickness of the second electrode sheet 3 is a total thickness of all the layers of the second current collector 31, the second active material layer 32 applied on the second current collector 31, and the second electrode tab 4 welded on the second current collector 31. The thickness of the separator 6 in the cell 10 is a total thickness of all the layers of the separator 6. The thickness of the green tape is a total thickness of the protective adhesive of the first protective adhesive 7 and the second protective adhesive.

In some cells 10, the maximum thickness lies at the first electrode tab 2 or the second electrode tab 4; a difference between the thickness at the first bending section 5 and the thickness at the electrode tab ranges from 300 to 540 μm; a difference between the thickness at the first end portion 111 and the thickness at the electrode tab ranges from 20 to 240 μm. In other embodiment, a difference between the thickness at the first abutting segment 311 and the thickness at the electrode tab is less than 150 μm; a difference between the thickness at the first end portion 111 and the thickness at the electrode tab is less than 50 μm.

In some other cells 10, the maximum thickness lies at the first protective adhesive 7; a difference between the thickness at the first abutting segment 311 and the thickness at the electrode tab ranges from 280 to 530 μm; a difference between the thickness at the first end portion 111 and the thickness at the electrode tab ranges from 180 to 230 μm. By adding the second protective adhesive, the thickness of the first diaphragm adhesive 33 is increased, and the difference between the thickness at the first abutting segment 311 and the thickness at the electrode tab can be less than 150 μm.

The diaphragm length of the first diaphragm tail of the first electrode sheet 1 can be extended to the first abutting segment 311 to compensate the thickness of this region. The diaphragm length of the second diaphragm tail of the second electrode sheet 3 can be extended to the first abutting segment 311 to compensate the thickness of this region.

The cell 10 according to the embodiments of the present application will be described in detail with reference to the drawings.

Figure 7:
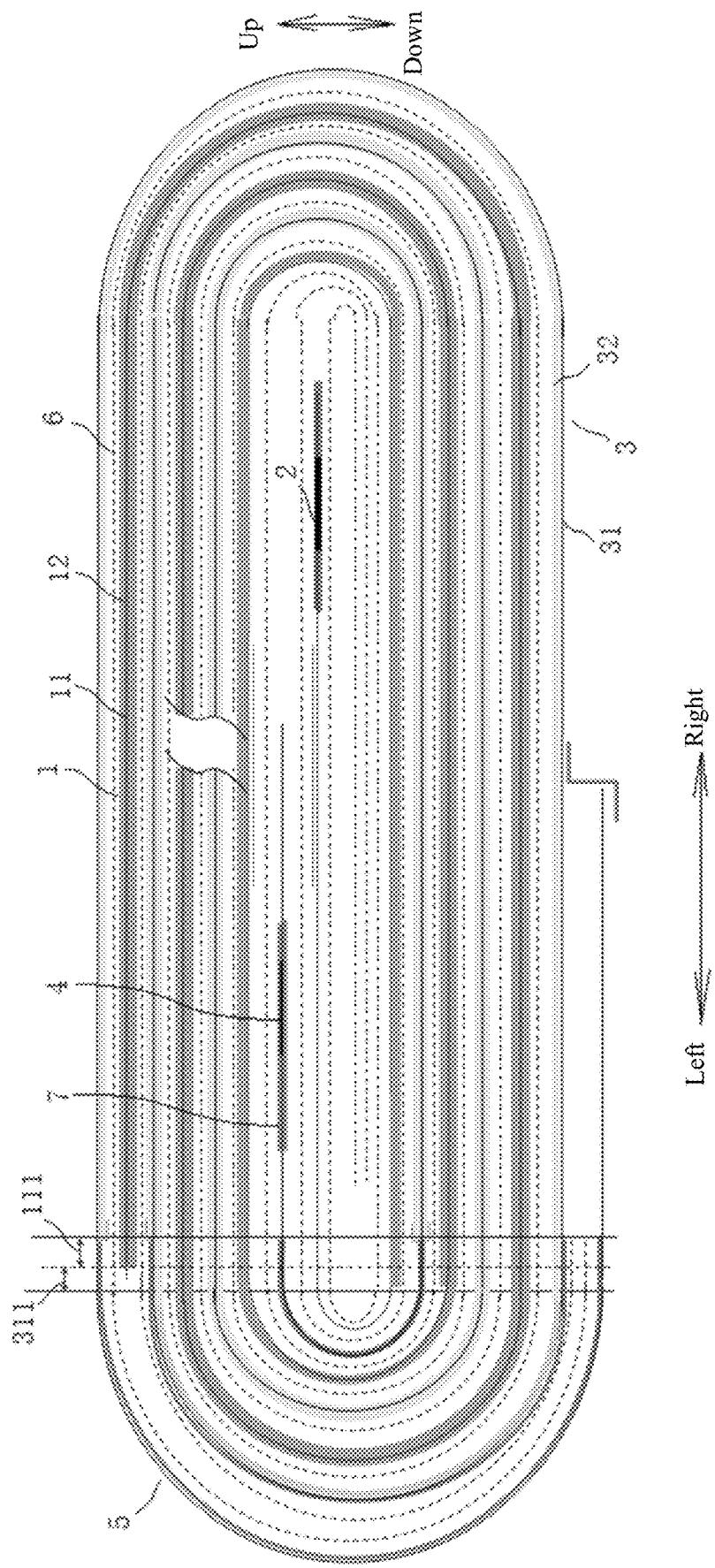
FIG. 7 is a schematic view of a cell according to another specific embodiment of the present application.

As illustrated in FIG. 7, according to a specific embodiment of the present application, the wound structure is composed of the first electrode sheet 1, the separator 6 and the second electrode sheet 3. The first diaphragm adhesive 33 at the head of the second electrode sheet 3 is improved in terms of protection, and the thickness of the first diaphragm adhesive 33 is increased. In this embodiment, the first electrode sheet 1 can include the first current collector 11, the first active material layer 12 applied on the first current collector 11, the first electrode tab 2 welded on the first current collector 11, the second protective adhesive, and the first protective adhesive 7. The second electrode sheet 3 can include the second current collector 31, the second active material layer 32 applied on the second current collector 31, the second electrode tab 4 welded on the second current collector 31, the second diaphragm, the first diaphragm adhesive 33, and the first protective adhesive 7.

In this embodiment, the wound structure can be realized in such a way that the separator 6 is fed, and a roll core clamps the separator 6 and rotates, so that the roll core and the separator 6 form an angle of about 30°; the first electrode sheet 1 enters the roll core with a feeding position determined by the position of the first electrode tab 2, after the electrode tab is welded and applied with an electrode tab adhesive and a protective adhesive; the roll core drives the first electrode sheet 1 and the separator 6 to rotate by half a turn; afterwards, the second electrode sheet 3 enters the roll core with a feeding position determined by the position of the second electrode tab 4, after the electrode tab is welded, and applied with an electrode tab adhesive; subsequently, the roll core rotates continuously until the winding is completed, and then is pulled out; as a result, a bare cell 10 with objective wound structure is obtained.

In this embodiment, a length of the first diaphragm of the first electrode sheet 1 is greater than a length of the second diaphragm of the second electrode sheet 3 by 3 to 5 mm; a distance between the first diaphragm and a corner arc is 0 to 0.5 mm; a length of the tail of the first diaphragm of the first electrode sheet 1 is greater than a length of the second diaphragm by 1 to 3 mm, and a distance between the first diaphragm and a corner arc is 1.5 to 3.5 mm. The first protective adhesive 7 and the second diaphragm overlap by 0.5 to 2 mm, and after the first diaphragm glue 33 passes through the arc, a tail end of the first diaphragm adhesive 33 should fall within the first end portion 111. The first diaphragm adhesive 33 may be a modified protective adhesive as illustrated in FIGS. 3-5, in which a thin end is 16 µm in thickness and 2 mm in width, while a thick end is designed to be 40 µm in thickness and 9 mm in width. The first diaphragm adhesive 33 on the tail of the second diaphragm can also be a modified protective adhesive as illustrated in FIGS. 3-5, in which a thin end is 16 µm in thickness and 2 mm in width, while a thick end is designed to be 40 µm in thickness and 13 mm in width.

In this embodiment, a difference between the thickness at the first abutting segment 311 and the thickness at the electrode tab=the thickness of the first diaphragm adhesive 33 of the second diaphragm at the head of the four-layered second electrode sheet 3+the thickness of the first diaphragm adhesive 33 of the second diaphragm at the tail of the four-layered second electrode sheet 3−2*(the thickness of the second diaphragm−the thickness of the second current collector 31)−the thickness of the electrode tab−the thickness of two layers of the first protective adhesive 7−the thickness of one layer of the first electrode sheet 1 in the first bending section 5−a thickness difference of one layer of the first diaphragm in an overhang section and one layer of the first diaphragm in a non-overhang section+the thickness of two layers of the separator 6.

In this embodiment, a difference between the thickness at the first end portion 111 and the thickness at the electrode tab=the thickness of the first diaphragm adhesive 33 of the second diaphragm at the head of the four-layered second electrode sheet 3+the thickness of the first diaphragm adhesive 33 at the tail of the four-layered second electrode sheet 3−2*(the thickness of the second diaphragm−the thickness of the second current collector 31)−the thickness of the electrode tab−the thickness of two layers of the first protective adhesive 7−a thickness difference of two layers of the first diaphragm in the overhang section and two layers of the first diaphragm in the non-overhang section+the thickness of two layers of the separator 6.

In this embodiment, the thickness of the second diaphragm may be 118.5 µm, the thickness of the second current collector 31 may be 10 µm, the thickness of the electrode tab may be 80 µm, the thickness of the first protective adhesive 7 may be 10 µm, the thickness of the first electrode sheet 1 may be 151.4 µm, the thickness difference of the first diaphragm in the overhang section and in the non-overhang section may be 16.5 the thickness of the separator 6 may be 10 µm, the thickness of the first diaphragm adhesive 33 at both of the head and tail of the second electrode sheet 3 may be 16 µm in a conventional design, the thickness difference between the first end portion 111 and the electrode tab is 337.1 µm, and the thickness difference between the first abutting segment 311 and the electrode tab is 202.2 µm. When a 40 µm thick modified second protective adhesive is employed, the thickness difference between the first end portion 111 and the electrode tab is 145.1 µm, and the thickness difference between the first abutting segment 311 and the electrode tab is 10.2 µm, such that the thickness difference can be reduced and controlled within 200 µm, thereby improving the flatness of the cell 10. Additionally, the process of applying the first diaphragm adhesive 33 with an increased thickness is the same as the process of applying the first diaphragm adhesive 33 at the thin head, so the device does not need to be modified or upgraded, and the production efficiency will not be affected.

Figure 10:
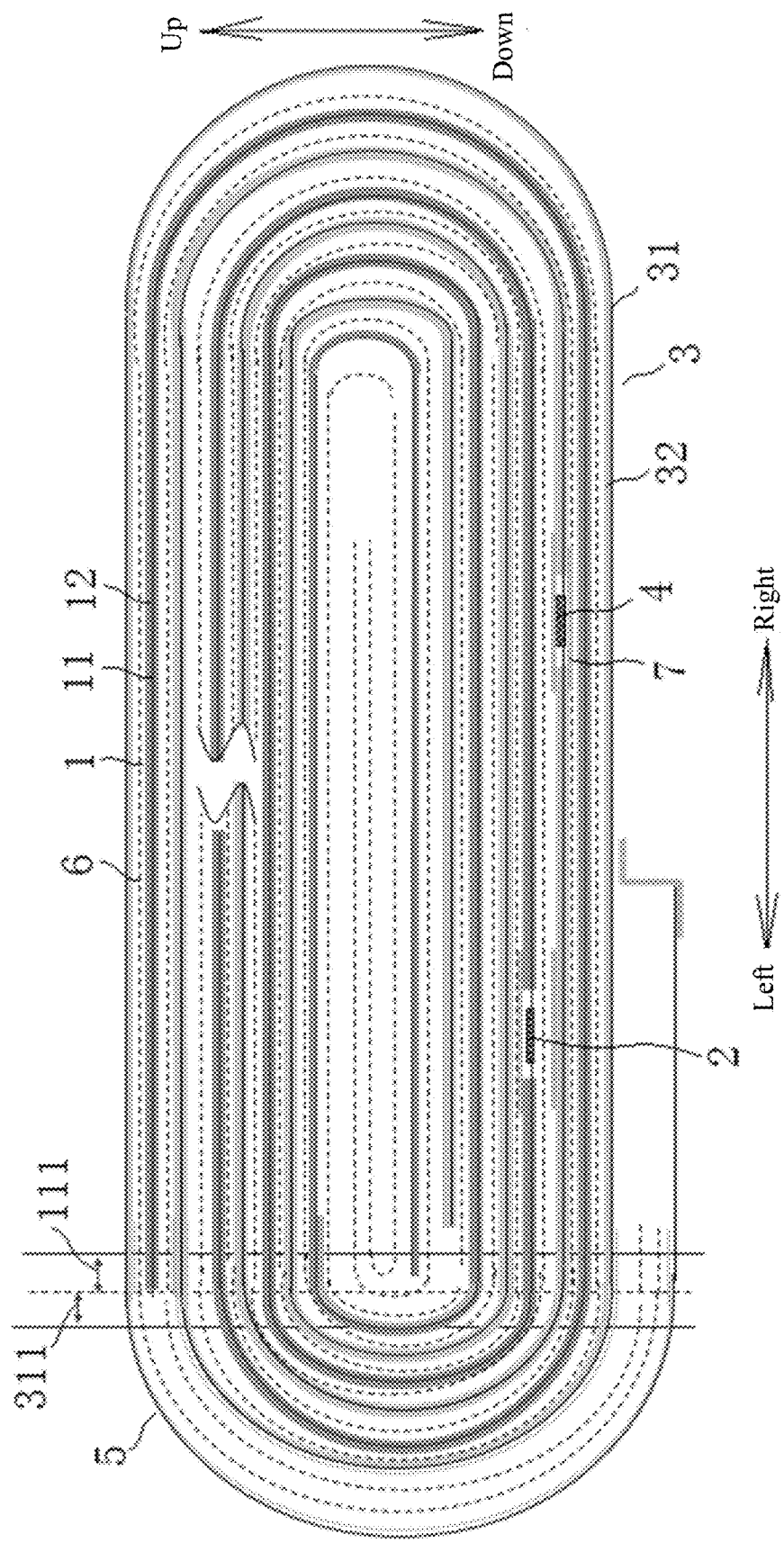
FIG. 10 is a schematic view of a cell according to another specific embodiment of the present application.

As illustrated in FIG. 10, according to another specific embodiment of the present application, the second protective adhesive is added to the structure of the cell 10, and the second protective adhesive is used to protect a cutting position. Moreover, the diaphragm length of the first diaphragm at the tail of the first electrode sheet 1 and the diaphragm length of the second diaphragm at the tail of the second electrode sheet 3 can be extended to the first abutting segment 311. The wound structure is composed of the first electrode sheet 1, the separator 6 and the second electrode sheet 3, and the thickness of the first diaphragm adhesive 33 of the second diaphragm at the head of the second electrode sheet 3 and the thickness of the first diaphragm adhesive 33 of the second diaphragm at the tail of the second electrode sheet 3 are both increased. In this embodiment, the first electrode sheet 1 can include the first current collector 11, the first active material layer 12 applied on the first current collector 11, the first electrode tab 2 welded on the first current collector 11, the first protective adhesive 7, and the second protective adhesive. The first active material layer 12 is coated on both sides of the first current collector 11, in which one side is continuously coated, marked as a long side, and the other side is coated with intervals, marked as a short side. The short side needs to be provided with the second protective adhesive, and the second protective adhesive is a modified protective adhesive with a thin end of 10 µm thickness and 2 mm width, and a thick end of 40 µm thickness and 5 mm width. The second protective adhesive and the first diaphragm overlap by 0.5 to 2 mm. After the second protective adhesive passes through the arc, its tail end should fall within the first end portion 111. The second electrode sheet 3 can include the second current collector 31, the second active material layer 32 applied on the second current collector 31, the second electrode tab 4 welded on the second current collector 31, and the first diaphragm adhesive 33 and the first protective adhesive 7 on two opposite sides of the second diaphragm at the head and tail of the second electrode sheet 3.

In this embodiment, the first diaphragm at the head of the first electrode sheet 1 is longer than the second diaphragm of the second electrode sheet 3 by 3 to 5 mm; the distance between the first diaphragm at the head of the first electrode sheet 1 and the first bending section 5 is 0 to 0.5 mm; the first diaphragm at the tail of the first electrode sheet 1 corresponds to and is flush with the second diaphragm of the second electrode sheet 3, with a maximum value of misalignment being 1 mm; the first diaphragm at the tail of the first electrode sheet 1 and the second diaphragm at the tail of the second electrode sheet 3 need to exceed the first bending section by 50~1.0 mm; and the thickness of the first diaphragm adhesive 33 at the tail of the second electrode sheet 3 can be 16 µm.

In this embodiment, the first diaphragm adhesive 33 at the tail of the second electrode sheet 3 is to overlap the second diaphragm by 2.5 to 4 mm, and after the first diaphragm adhesive 33 at the head and tail of the second electrode sheet 3 passes through the first bending section 5, the tail end of the first diaphragm adhesive 33 should fall at the first end portion 111. The first abutting segment 311 and the first end portion 111 have the consistent thickness, such that the thickness difference between the overhang section and the electrode tab=the thickness of one layer of the second protective adhesive+the thickness of the first diaphragm adhesive 33 at the tail of the four-layered second electrode sheet 3−1*(the thickness of the second diaphragm−the thickness of the second current collector 31)−the thickness of two layers of the first protective adhesive 7−the thickness difference of two layers of the first diaphragm in the overhang section and two layers of the first diaphragm in the non-overhang section+the thickness of two layers of the separator 6.

Figure 6:
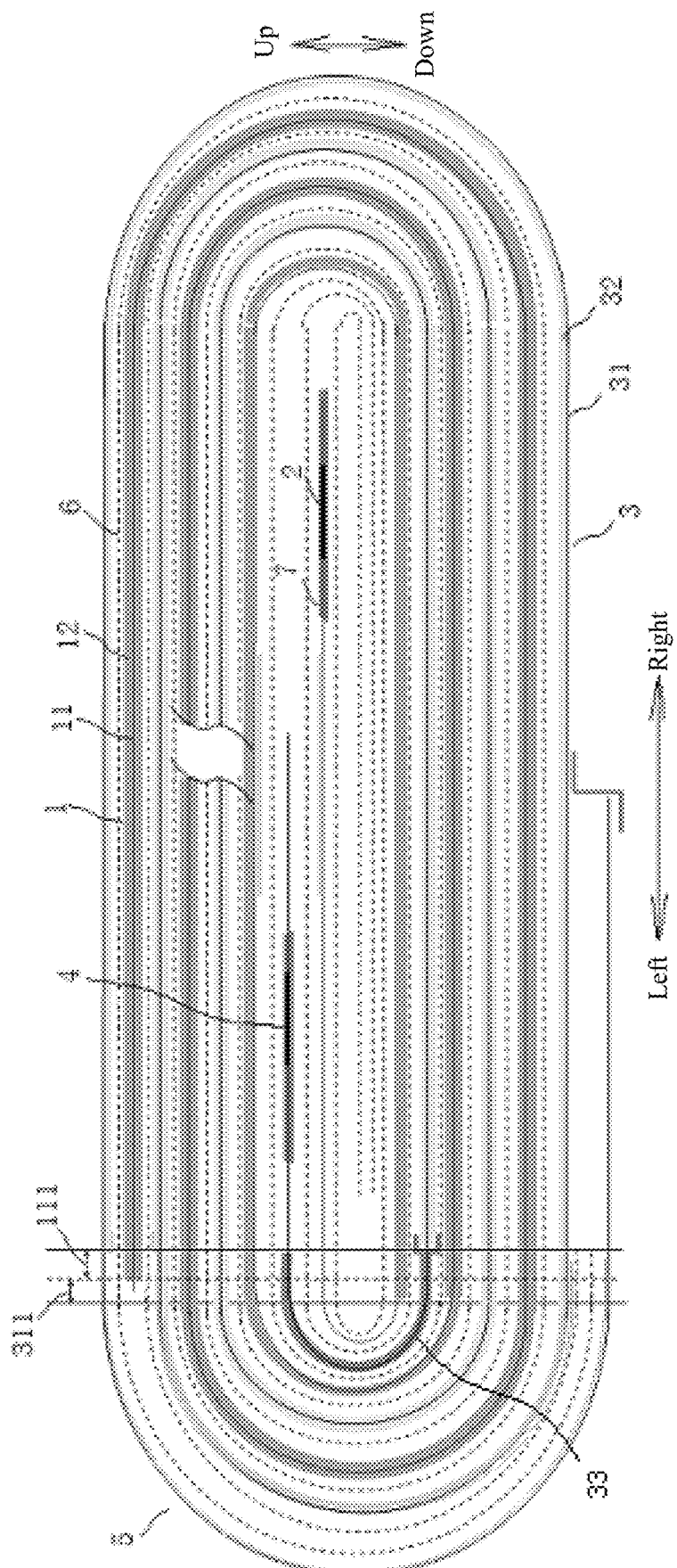
FIG. 6 is a schematic view of a cell according to another specific embodiment of the present application.

As illustrated in FIG. 6, according to another specific embodiment of the present application, the cell 10 has an increased thickness of the first diaphragm adhesive 33 at the head of the second electrode sheet 3.

Figure 8:
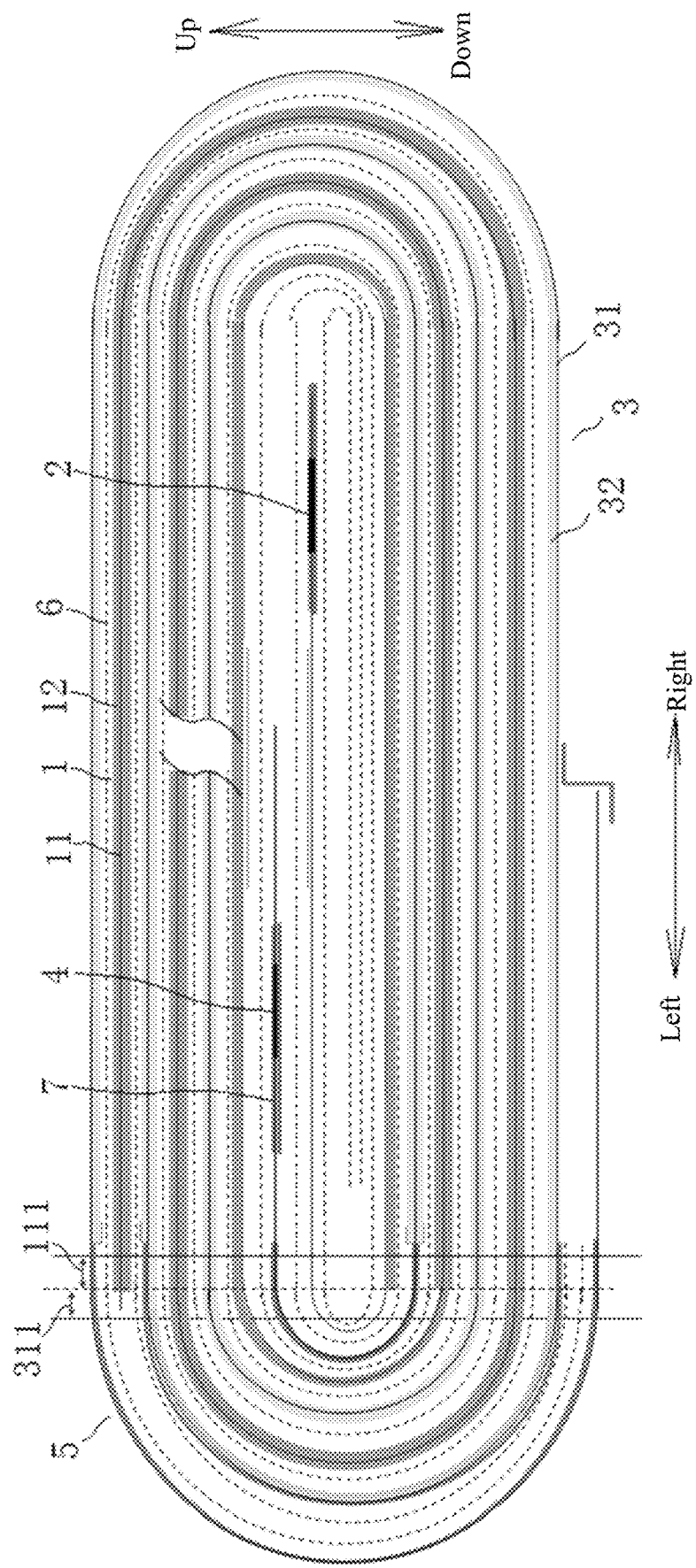
FIG. 8 is a schematic view of a cell according to another specific embodiment of the present application.

As illustrated in FIG. 8, according to another specific embodiment of the present application, the cell 10 has an increased thickness of the first diaphragm adhesive 33 at the head of the second electrode sheet 3, and also an increased thickness of the first diaphragm adhesive 33 at the tail of the second electrode sheet 3; moreover, the first diaphragm at the tail of the first electrode sheet 1 is extended to the first abutting segment 311.

Figure 9:
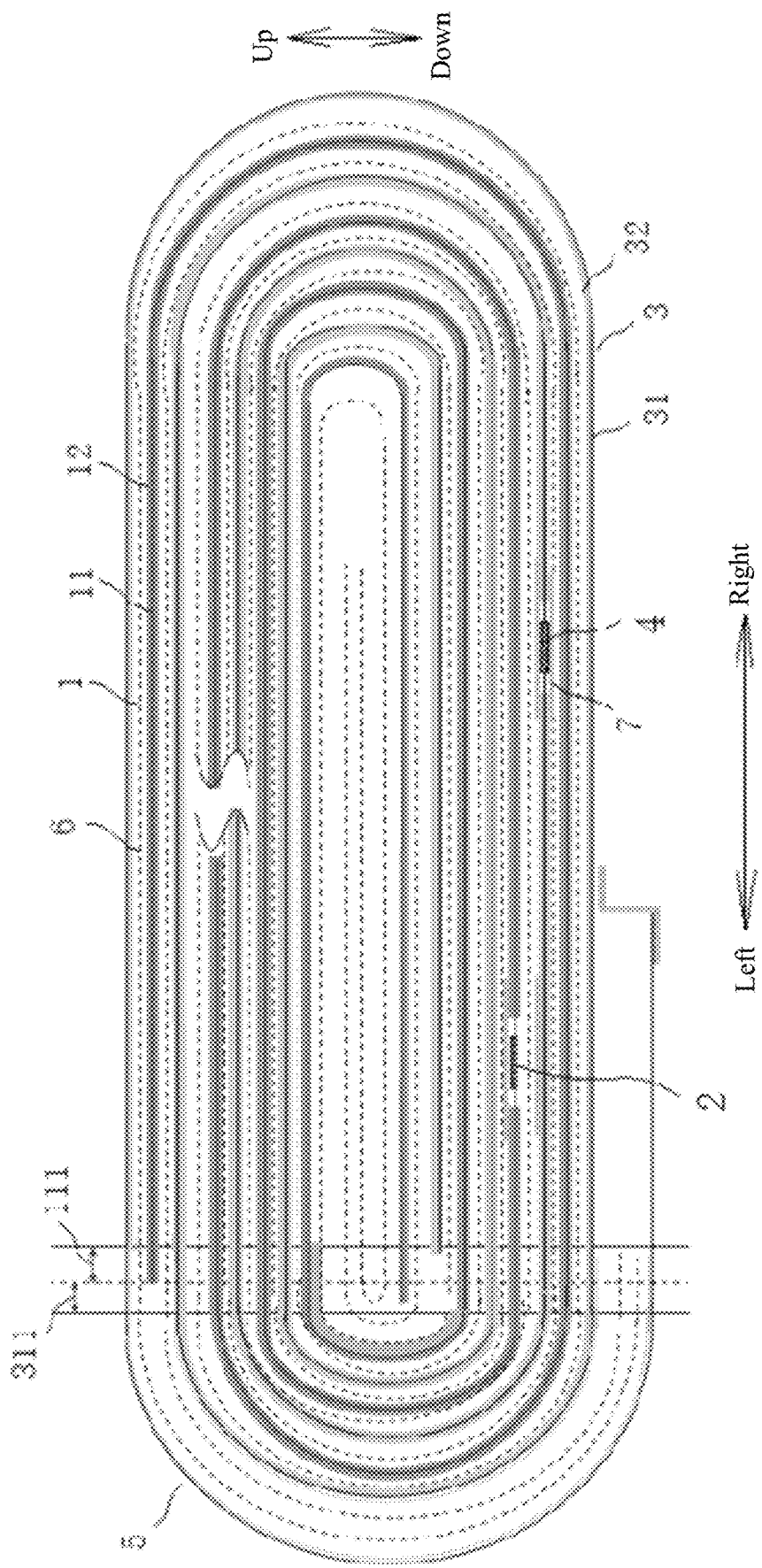
FIG. 9 is a schematic view of a cell according to another specific embodiment of the present application.

As illustrated in FIG. 9, according to another specific embodiment of the present application, the cell 10 is additionally provided with the second protective adhesive.

Figure 11:
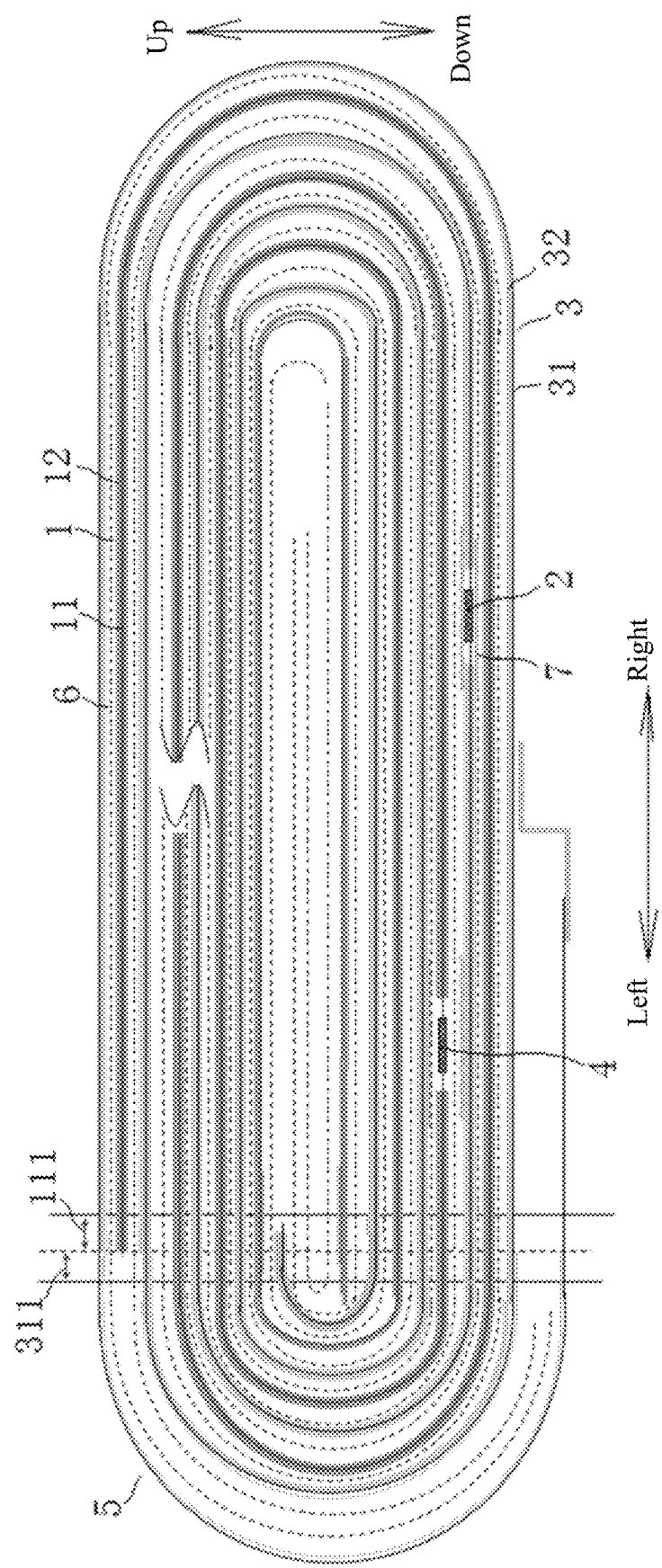
FIG. 11 is a schematic view of a cell according to another specific embodiment of the present application.

As illustrated in FIG. 11, according to another specific embodiment of the present application, the cell 10 is additionally provided with the second protective adhesive, and the cell 10 is also additionally provided with the first diaphragm adhesive 33 at the second diaphragm at the head of the second electrode sheet 3.

Figure 12:
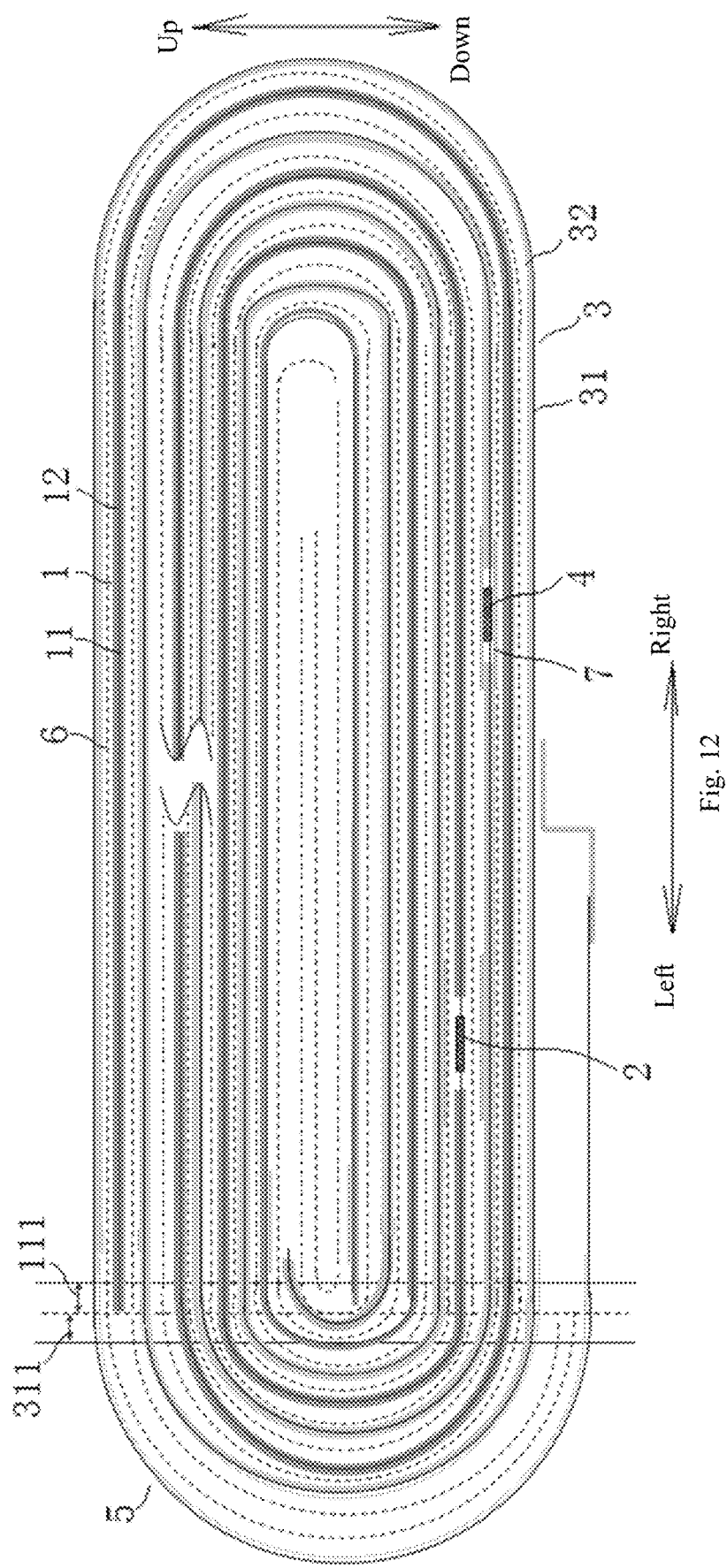
FIG. 12 is a schematic view of a cell according to another specific embodiment of the present application.

As illustrated in FIG. 12, according to another specific embodiment of the present application, the cell 10 is additionally provided with the second protective adhesive, and the cell 10 is also additionally provided with the first diaphragm adhesive 33 at the second diaphragm at the head of the second electrode sheet 3; moreover, the diaphragm length of the first diaphragm at the tail of the first electrode sheet 1 is extended to the first end portion 111.

In a specific embodiment as illustrated in FIG. 8, the first diaphragm at the tail of the first electrode sheet 1 is extended to the first abutting segment 311 to increase the thickness of the first abutting segment 311. In a specific embodiment as illustrated in FIG. 10, the first diaphragm at the tail of the first electrode sheet 1 and the second diaphragm at the tail of the second electrode sheet 3 are both extended to the first abutting segment 311 to increase the thickness of the first abutting segment 311. In a specific embodiment as illustrated in FIG. 12, the first diaphragm at the tail of the first electrode sheet 1 is extended to the first abutting segment 311 to increase the thickness of the first abutting segment 311, such that the flatness of the cell 10 can be further improved, and the energy density of the cell 10 can be further enhanced, thereby further reducing the risk of cycle failure caused by insufficient pressure and loose interface contact at the corners of the cell 10 at the time of fixture formation thereof.

In a specific embodiment as illustrated in FIG. 11, by adding the second protective adhesive in the cutting position and adding the first diaphragm adhesive 33 to the second diaphragm at the head of the second electrode sheet 3 to increase the thickness of the first abutting segment 311, the flatness of the cell 10 can be further improved, and the energy density of the cell 10 can be further enhanced, thereby further reducing the risk of cycle failure caused by insufficient pressure and loose interface contact at the corners of the cell 10 at the time of fixture formation thereof.

An electrochemical device according to embodiments of the present application includes the cell 10 in the above embodiments. The cell 10 is mounted to the electrochemical device, and with such a cell 10, the thickness of the cell 10 can be made more uniform to improve the flatness of the cell 10 and enhance the energy density of the cell 10, thereby further reducing the risk of cycle failure caused by insufficient pressure and loose interface contact at the corners of the cell 10 at the time of fixture formation thereof.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present application. Thus, the appearances of the phrases throughout this specification are not necessarily referring to the same embodiment or example. Furthermore, the particular features, structures, materials, or characteristics may be combined in any suitable manner in one or more embodiments or examples.

Although embodiments of the present application have been shown and described, it would be appreciated by those skilled in the art that various changes, modifications, alternatives and variations can be made to the embodiments of the present application without departing from the principle and scope of the present application. The scope of the present application is defined by the claims or the like.

What is claimed is:

1. A cell, comprising:
a first electrode sheet comprising a first current collector and a first active material layer, the first current collector comprising a first end portion;
a first electrode tab electrically connected with the first current collector;
a second electrode sheet comprising a second current collector and a second active material layer, the second active material layer being located on a surface of the second current collector; and
a second electrode tab electrically connected with the second current collector;
wherein the first end portion consists of an entire portion of the first current collector that extends beyond an adjacent second active material layer, two sides of the first end portion being provided with the first active material layer; and the first end portion has a width being one third of a width of the first electrode tab; and in a first direction, the cell has a thickness t at the first end portion, the cell has a thickness T at the first electrode tab or the second electrode tab, and t is greater than or equal to 95% of T.

2. The cell according to claim 1, wherein the second current collector comprises a first abutting segment adjacent to the first end portion, and in the first direction, the first abutting segment does not overlap with the first end portion; in the first direction, the cell has a thickness ta at the first abutting segment, and an absolute value of a difference between ta and T is smaller than or equal to 150 μm.

3. The cell according to claim 2, further comprising a first bending section, wherein the first abutting segment is located between the first bending section and the first end portion, and an absolute value of a difference between t and T is smaller than or equal to 50 μm.

4. The cell according to claim 3, further comprising a separator located between the first electrode sheet and the second electrode sheet;
wherein the second electrode sheet is further provided with a first diaphragm adhesive;
the thickness t at the first end portion is composed of a thickness t1 of a plurality of layers of the first electrode sheets, a thickness t2 of a plurality of layers of the second electrode sheets, a thickness t3 of a plurality of layers of the separators, and a thickness t4 of a plurality of layers of the first diaphragm adhesive, wherein t1, t2, t3, and t4 are greater than zero.

5. The cell according to claim 1, wherein the first electrode sheet comprises a first diaphragm, and the first diaphragm is provided to a head and a tail of the first active material layer; and the second electrode sheet comprises a second diaphragm, and the second diaphragm is provided to a head and a tail of the second active material layer, the first diaphragm adhesive being provided on the second diaphragm in a first bending section.

6. The cell according to claim 5, wherein the first diaphragm adhesive at a head of the second electrode sheet has a thickness of 25 to 100 µm and a width of 8 to 16 mm.

7. The cell according to claim 5, wherein the first diaphragm adhesive at a tail of the second electrode sheet has a thickness of 25 to 100 µm and a width of 12 to 20 mm.

8. The cell according to claim 4, wherein the first diaphragm adhesive is an adhesive tape with a gradient change in thickness.

9. The cell according to claim 8, wherein the first diaphragm adhesive comprises a first thickness segment and a second thickness segment, and the first thickness segment has a thickness smaller than the second thickness segment.

10. The cell according to claim 9, wherein the first thickness segment has a thickness of 10 to 16 µm, while the second thickness segment has a thickness of 25 to 100 µm.

11. The cell according to claim 1, wherein the first electrode tab or the second electrode tab is provided with a first protective adhesive;

the thickness T at the first electrode tab or the second electrode tab is composed of a thickness t1 of a plurality of layers of the first electrode sheets, the thickness t2 of the plurality of layers of the second electrode sheets, the thickness t3 of the plurality of layers of the separators, a thickness t5 of the first electrode tab or the second electrode tab, and a thickness t6 of the first protective adhesive, wherein t1, t2, t3, t4, t5, and t6 are greater than zero.

12. The cell according to claim 11, wherein the first protective adhesive is provided to two sides of the first electrode tab or two sides of the second electrode tab.

13. The cell according to claim 5, wherein the thickness ta at the first abutting segment is composed of the thickness t1 of the plurality of layers of the first electrode sheets, the thickness t2 of the plurality of layers of the second electrode sheets, and the thickness t4 of the plurality of layers of the first diaphragm adhesive, the first diaphragm and the second diaphragm being located within the first abutting segment, wherein t1, t2, t3, and t4 are greater than zero.

14. The cell according to claim 1, wherein the second electrode sheet further comprises a second protective adhesive configured to protect a cutting position, the second protective adhesive is provided to the second current collector, and the second protective adhesive has a thickness of 25 to 100 µm and a width of 8 to 16 mm.

15. An electrochemical device, comprising a cell, the cell comprising:

a first electrode sheet comprising a first current collector and a first active material layer, the first current collector comprising a first end portion;

a first electrode tab electrically connected with the first current collector;

a second electrode sheet comprising a second current collector and a second active material layer, the second active material layer being located on a surface of the second current collector; and a second electrode tab electrically connected with the second current collector;

wherein the first end portion consists of an entire portion of the first current collector that extends beyond an adjacent second active material layer, two sides of the first end portion being provided with the first active material layer; and the first end portion has a width being one third of a width of the first electrode tab, and in a first direction, the cell has a thickness t at the first end portion, the cell has a thickness T at the first electrode tab or the second electrode tab, and t is greater than or equal to 95% of T.

16. The electrochemical device according to claim 15, wherein the second current collector comprises a first abutting segment adjacent to the first end portion, and in the first direction, the first abutting segment does not overlap with the first end portion;

in the first direction, the cell has a thickness ta at the first abutting segment, and an absolute value of a difference between ta and T is smaller than or equal to 150 µm.

17. The electrochemical device according to claim 16, wherein the cell further comprises a first bending section, the first abutting segment is located between the first bending section and the first end portion, and an absolute value of a difference between t and T is smaller than or equal to 50 µm.

18. The electrochemical device according to claim 17, wherein the cell further comprises a separator located between the first electrode sheet and the second electrode sheet;

the second electrode sheet is further provided with a first diaphragm adhesive;

the thickness t at the first end portion is composed of a thickness t1 of a plurality of layers of the first electrode sheets, a thickness t2 of a plurality of layers of the second electrode sheets, a thickness t3 of a plurality of layers of the separators, and a thickness t4 of a plurality of layers of the first diaphragm adhesive, wherein t1, t2, t3, and t4 are greater than zero.

19. The electrochemical device according to claim 18, wherein the first electrode sheet comprises a first diaphragm, and the first diaphragm is provided to a head and a tail of the first active material layer; and the second electrode sheet comprises a second diaphragm, and the second diaphragm is provided to a head and a tail of the second active material layer, the first diaphragm adhesive being provided on the second diaphragm.

20. The electrochemical device according to claim 19, wherein the first diaphragm adhesive at a head of the second electrode sheet has a thickness of 25 to 100 µm and a width of 8 to 16 mm.

* * * * *